(No Model.)
G. M. WEST.
COMBINED HARROW AND ROLLER.
No. 454,098. Patented June 16, 1891.
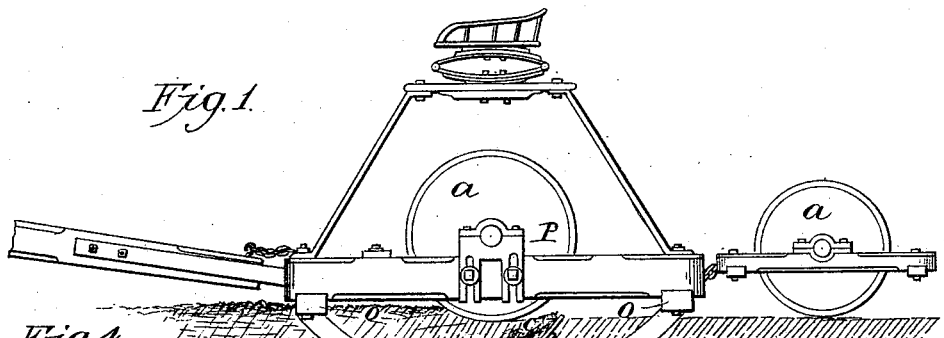
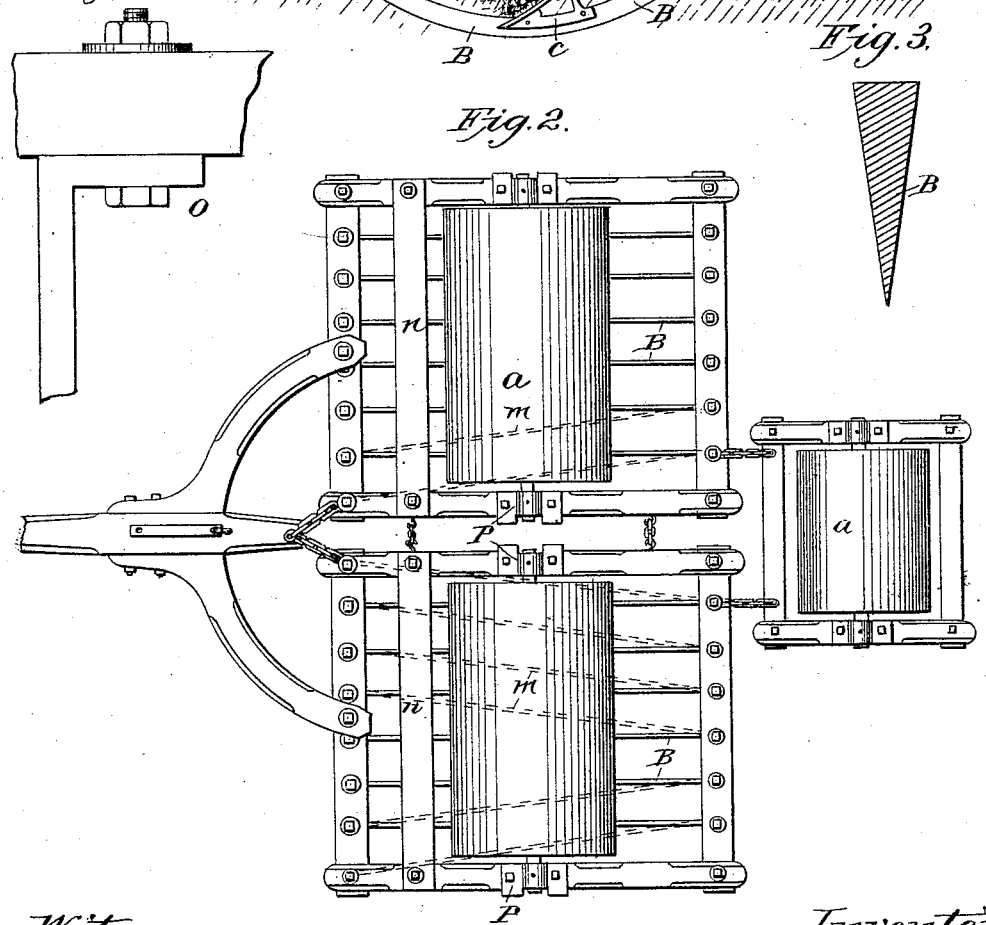
Witnesses:
A. C. Webb
A. Ruppert
Inventor
George Miller West
Per
Thomas P. Simpson
Atty

UNITED STATES PATENT OFFICE.

GEORGE MILLER WEST, OF MONMOUTH, ILLINOIS.

COMBINED HARROW AND ROLLER.

SPECIFICATION forming part of Letters Patent No. 454,098, dated June 16, 1891.

Application filed April 5, 1890. Serial No. 346,786. (No model.)

*To all whom it may concern:*

Be it known that I, GEORGE MILLER WEST, a citizen of the United States, residing at Monmouth, in the county of Warren and State of Illinois, have invented certain new and useful Improvements in Combined Harrows and Rollers; and I do hereby declare the following to be a full, clear, and exact description of the invention, such as will enable others skilled in the art to which it appertains to make and use the same.

The invention will first be described in connection with the drawings, and then pointed out in the claims.

Figure 1 of the drawings is a side elevation; Fig. 2, a plan view; Fig. 3, a vertical cross-section of the tooth, and Fig. 4 a detail view showing the way in which the tooth is bolted to the frame. Fig. 5 is a detail perspective view showing the slot in the teeth to permit them to be arranged parallel to the line of direction of the machine or diagonal thereto.

In the drawings, $a\,a$ represent transversely-aligned rollers arranged in the adjustable bearings P and about the middle of the frame.

A' is the rear roller, intended to roll the space left between the rollers $a\,a$.

B are cultivator-teeth, made longitudinally in the shape of a bow and transversely in the form of a wedge and pivoted at both ends under the frame at regular intervals. These teeth may be pivoted so as to work parallel to the line of draft or diagonally thereto, as indicated by the dotted line $m$. The bow-shaped downwardly-convex teeth will either cut through roots or clods in their path or rise up and slide over them, being thus adapted to relieve themselves automatically when obstructed.

When used as a straddle-row cultivator, the shovels $c$ are attached to the cutters at any preferred distance apart, as shown in Fig. 1 of the drawings. The rollers $a\,a$ work over the middle of the teeth, and, being adjustable, regulate the depth to which said teeth may extend into the soil.

What I claim as new, and desire to protect by Letters Patent, is—

1. A harrow-tooth having a sharp bow-shaped convex edge, slotted at one end and having a bolt-hole at the other, whereby it may be pivoted at both ends to the frame, so as to be parallel or diagonal to the line of draft, as set forth.

2. A harrow-frame carrying subjacent teeth, adjustable side bearings P, and superposed rollers journaled in said bearings, as shown and described.

GEORGE MILLER WEST.

Witnesses:
 J. F. LEMBERGER,
 T. J. CROSBY.